Patented June 15, 1943

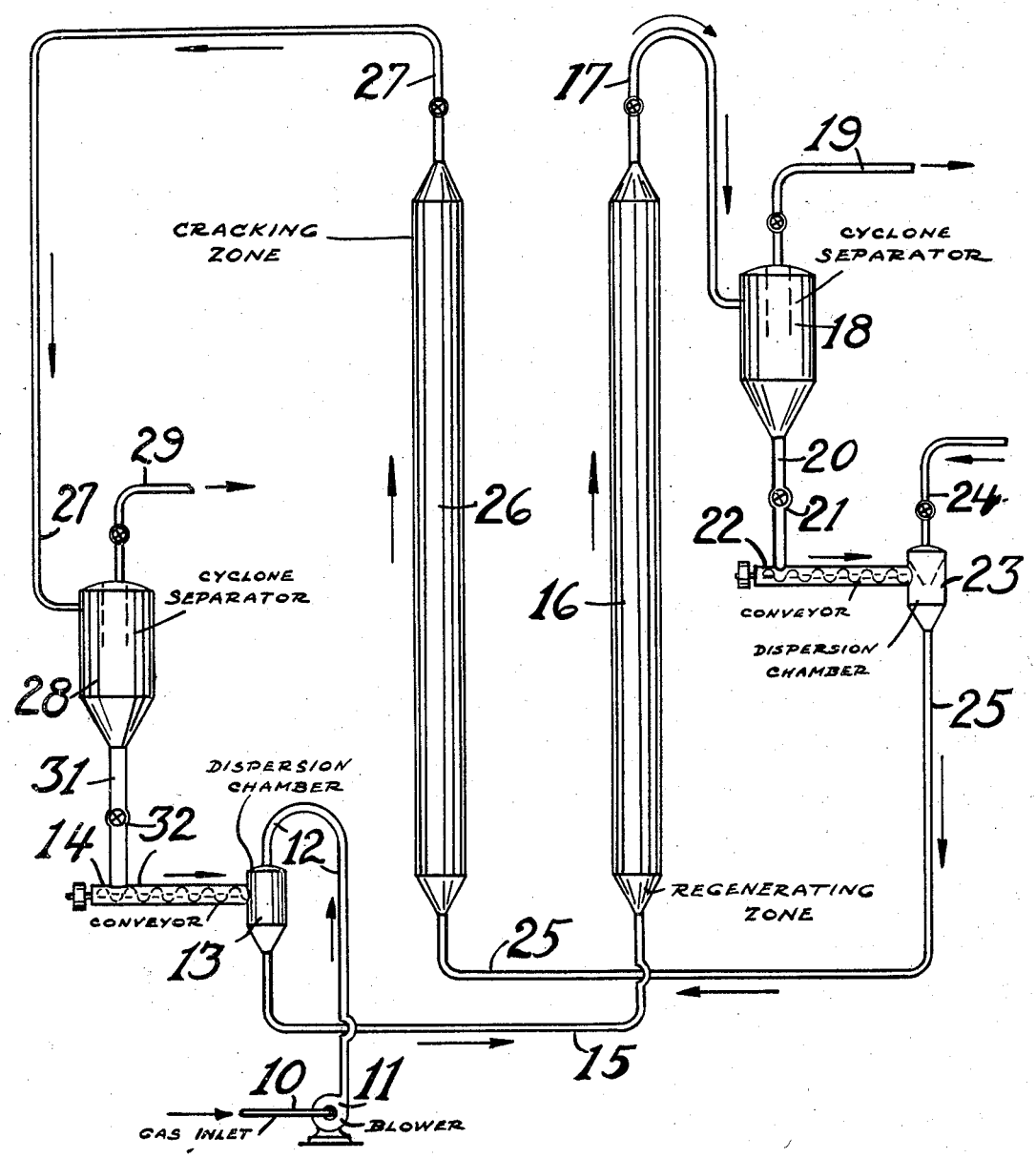

2,322,075

UNITED STATES PATENT OFFICE 2,322,075

REGENERATION OF POWDER

Charles W. Tyson, Summit, N. J., assignor to Standard Oil Development Company, a corporation of Delaware Application November 30, 1940, Serial No. 368,026

1 Claim. (Cl. 252—242)

This invention relates to the regeneration of powdered contact masses containing carbonaceous deposits and pertains more particularly to a method of controlling the temperature during regeneration.

In the treatment of carbonaceous materials such as hydrocarbon oil with solid contact material, particularly when operating at elevated temperatures, the catalyst mass becomes contaminated with carbonaceous deposits more or less rapidly, which impairs the effectiveness of the contact material for bringing about the desired treatment. It has been a practice in the past to remove such carbonaceous deposits by burning in an oxidizing atmosphere. During such burning or regenerating treatment, considerable heat is evolved. In many cases it is necessary to maintain a close temperature control in order to avoid permanently impairing the efficiency of the mass for a given treatment. For example, in contact treatment of hydrocarbon oils with natural or acid treated clays, such as in the cracking, purifying and refining of such oils, the efficiency of the clay is seriously impaired if the temperature during regeneration is allowed to exceed about 1000° F., for example.

While the invention in its broader phases will have a more general application, it is particularly adapted to the regeneration of catalyst or other contact agents containing hard coke-like deposits formed during high temperature treatment of hydrocarbon oils, such as in the catalytic cracking of oil. In such cases the difference between the ignition temperature necessary to burn the deposits and the maximum permissible temperature which will avoid permanently deactivating the material is relatively small and may be of the order of from 200° to 300° F.

In the catalytic cracking of oils, two general types of operation have heretofore been proposed. According to one type, the cracking chamber is provided with a bed or a plurality of beds of solid catalyst, preferably preformed into briquettes, pills, or the like, and the oil vapors to be cracked are passed through the beds. When operating in this manner, the cracking operation must be periodically interrupted to regenerate the catalyst. During regeneration the oil vapors are replaced by an oxidizing gas which burns the carbonaceous deposits. In view of the fact that the catalyst mass is in general a very poor heat conductor, the temperature normally rises rapidly and in order to control the temperature it is necessary to provide either a large heat exchange surface in the catalyst beds or to dilute the oxidizing gas with inert gas, such as steam, combustion gases or the like to reduce the reaction rate and increase the heat capacity of the gases to remove the heat generated. The use of diluents, however, increases the time required for regeneration and consequently increases the time the cracking chamber is out of operation.

According to a second type of operation, the catalyst in finely-divided form is suspended in an oil stream and the suspension of catalyst in oil is passed through the cracking zone. In some cases the catalyst is suspended in liquid oil to form an oil-clay slurry, and in other cases the oil is first vaporized and the catalyst is injected into the oil vapors. When operating in this way, the powdered catalyst must be removed from the cracked product and periodically regenerated. The regeneration of such powdered materials presents problems quite different from those arising in the regeneration of catalysts contained in fixed beds as previously described.

One of the important objects of the present invention is to provide an improved method of regenerating powdered contact masses containing carbonaceous deposits.

A further object of the invention is to provide an improved method for controlling the temperature during the regeneration of powdered contact masses containing carbonaceous deposits.

Other more specific objects and advantages of the invention will be apparent from the more detailed description hereinafter in which reference will be made to the accompanying drawing which is a diagrammatic illustration of an apparatus capable of carrying the invention into effect.

Referring to the drawing, the reference character 10 designates a line through which an oxygen-containing regenerating gas is introduced into the system. Such regenerating gas may comprise air or it may be a mixture of air and diluent gas, such as steam, spent combustion gases, carbon dioxide, nitrogen, or the like. The invention, however, finds particular application in the regeneration of contact masses in which air alone is used as a regenerating medium.

The regenerating gas introduced through line 10 is forced by means of blower 11 through line 12 to a dispersing chamber 13 in which it is intimately mixed with the powdered catalytic material to be regenerated. The powdered catalytic material may be introduced into the dispersion chamber 13 through any suitable feeding mechanism, such as a screw conveyor 14.

The suspension of regenerating gas and powdered catalyst formed in the dispersion chamber 13 is transferred through line 15 to a regenerating zone 16 which, for illustrative purposes, has been shown in the form of a vertical tower through which the suspension passes in an upward direction. It will be understood, however, that the present invention is not limited in its broader phases to any particular form of reaction chamber.

The velocity of the regenerating stream passing through the regenerating chamber 16 may be sufficient to carry the powdered material at substantially the same velocity as the regenerating gas, or it may be at a lower velocity, in which the velocity of the powdered material is lower than that for the gases.

In accordance with the present invention, the length of time the powdered material is retained within the regenerating zone is controlled to prevent the temperature from rising beyond a point which would impair the effectiveness of the powdered material for its intended purpose.

The resident time of the powdered material within the regenerating zone may be regulated by controlling the speed of the blower 11. For example, the speed of the blower 11 may be regulated by means of a thermocouple located at the outlet of the regenerating chamber 16 so that as the outlet temperature increases the flow of regenerating gas will be caused to increase and thereby reduce the resident time of powdered material in the regenerating zone. If desired, the flow of powdered material into the regenerating stream may be increased or decreased as the flow of regenerating gas is increased or decreased.

After passing through the regenerating zone 16, the suspension of regenerated catalyst and regenerating gas is withdrawn therefrom through line 17 and passed to a suitable solid gas separator such as a cyclone separator 18 for separation of the regenerating gas from the catalyst. The regenerating gas separated from the powdered catalyst in the separator 18 is removed therefrom through line 19 and may be passed to a suitable recovery system (not shown) for removal of heat or energy from the gases.

The catalyst separated from the regenerating gases in the separator 18 may be withdrawn from the bottom thereof through valved line 20 from which it may be passed by means of a suitable transfer mechanism, such as a screw conveyor 22, to a second dispersion chamber 23, wherein it is intimately mixed with oil vapors to be cracked introduced into the system through line 24. The oil is preferably in a vaporized condition prior to being admixed with the catalyst and may be preheated to the required reaction temperature.

The suspension of oil vapors and regenerated catalyst may be passed through line 25 to a cracking zone 26 which, for illustrative purposes, is also shown in the form of a vertical tower with the suspension passing upwardly through the tower. The cracked products and catalyst from the cracking zone 26 pass through line 27 to a suitable solid gas separator such as a cyclone separator 28, in which the cracked products are separated from the catalyst. The cracked products separated in the separator 28 are withdrawn therefrom through line 29 and may be passed to a suitable fractionating system or other rectifying and refining equipment (not shown) for separation and purification of the final motor fuel product.

The catalyst separated in the separator 28 is subjected to regeneration as previously described. To this end the catalyst from separator 28 may be passed through a valved line 31 to the screw conveyor 14 for return to the regenerating circuit.

It will be understood that the above is only a general description of the operation of the process.

Having described the specific embodiments, it will be understood that the invention embraces such other variations and modifications as come within the spirit and scope thereof.

What is desired to be protected by Letters Patent is:

A method of regenerating powdered material contaminated with carbonaceous deposits wherein the regenerating temperature must be maintained below a predetermined maximum to avoid injuring the powdered material, which comprises suspending the powdered material to be regenerated in air, passing the resulting suspension through a regenerating zone, maintaining an oxidizing atmosphere within said zone at least at a minimum temperature sufficient to ignite said carbonaceous deposits, maintaining the temperature below said predetermined maximum solely by regulating the velocity of the air stream passing through said regenerating zone, and thereafter separating the powdered material from the gaseous stream.

CHARLES W. TYSON.